United States Patent [19]

Hoshi

[11] Patent Number: 4,846,064

[45] Date of Patent: Jul. 11, 1989

[54] SLIP SHEET INSERTION-DELIVERY APPARATUS FOR SHEET-FED PRINTING PRESS

[75] Inventor: Toshio Hoshi, Chiba, Japan

[73] Assignee: Komori Printing Machinery Co., Ltd., Japan

[21] Appl. No.: 126,753

[22] Filed: Nov. 30, 1987

[30] Foreign Application Priority Data

Dec. 4, 1986 [JP] Japan ................................ 61-287651

[51] Int. Cl.[4] ........................ B41F 21/00; B65G 29/00

[52] U.S. Cl. ................................ 101/419; 198/803.7; 271/9; 270/95

[58] Field of Search ............... 101/233, 238, 240, 246, 101/419; 198/408, 419, 420, 421, 422, 678, 803.3, 803.4, 803.7, 803.9, 803.1; 270/58, 57, 95; 271/82, 9

[56] References Cited

U.S. PATENT DOCUMENTS

| | | | |
|---|---|---|---|
| 2,158,552 | 5/1939 | Potdevin | 101/419 |
| 2,647,463 | 8/1953 | Ferrar | 101/419 |
| 2,984,178 | 5/1961 | Koch | 198/803.7 |
| 3,122,362 | 2/1964 | Vollrath et al. | 270/57 |
| 3,497,208 | 2/1970 | Reinartz et al. | 198/803.7 |
| 3,713,648 | 1/1973 | Spika | 198/803.7 |
| 3,831,781 | 8/1974 | Anikanov et al. | 198/420 |
| 3,948,508 | 4/1976 | Kanazawa | 198/803.7 |
| 4,409,741 | 10/1983 | Bonomi | 198/803.7 |
| 4,618,135 | 10/1986 | Greiner et al. | 271/9 |
| 4,681,213 | 7/1987 | Winiasz | 198/803.9 |

*Primary Examiner*—Eugene H. Eickholt

*Attorney, Agent, or Firm*—Remy J. VanOphem

[57] ABSTRACT

In a slip sheet insertion-delivery apparatus, a plurality of printing sheet grippers opposite to some of a plurality of gripper pads mounted on a gripper pad shaft and slip sheet grippers opposite to the remaining gripper pads are mounted on one gripper shaft. The slip sheet grippers are loosely fitted on the gripper shaft through corresponding torsion springs. A cam mechanism is arranged to simultaneously open/close the printing and slip sheet grippers near a cylinder. Another cam mechanism including a plurality of cams is arranged to simultaneously open/close only the slip sheet grippers at a slip sheet insertion position.

1 Claim, 4 Drawing Sheets

SLIP SHEET INSERTION-DELIVERY APPARATUS FOR SHEET-FED PRINTING PRESS

BACKGROUND OF THE INVENTION

The present invention relates to a slip sheet insertion-delivery apparatus for inserting and delivering a slip sheet between adjacent printing sheets in order to prevent offsetting when sheets are delivered and stacked in a sheet-fed printing press.

In a sheet-fed printing press, a sheet conveyed by a delivery chain after printing is released at a rear end of a conveying path and is dropped and stacked on a stack board. However, ink on a sheet immediately after printing is not yet dried, and if such sheets are stacked in this state, offsetting occurs. In order to prevent this, in a conventional printing press, powder is sprayed on a printed surface between a printing apparatus and a delivery apparatus or a printed surface is dried upon radiation of an infrared ray.

However, like in intaglio printing, a thickness of an ink film on a printed surface reaches several tens of microns, i.e., about ten times that in a lithographic printing press. In this case, even through a printed surface is forcibly dried by an infrared ray, drying is not sufficient. If powder is sprayed on a printed surface, quality of a printed product is degraded. Therefore, a slip sheet insertion-delivery apparatus which inserts a slip sheet between adjacent printing sheets when the sheets are delivered on a stack board has been conventionally used.

FIGS. 6 and 7 show a conventional slip sheet insertion-delivery apparatus. In FIGS. 6 and 7, a plurality of pairs of right and left gripper rod holders 2 are disposed at predetermined intervals between a pair of right and left delivery chains 1 which travel while circulating between a printing apparatus and a delivery apparatus. A gripper rod 6 consisting of a stationary gripper pad shaft 3, a pivotal printing sheet gripper shaft 4 and a pivotal slip sheet gripper shaft 5 is axially supported between each pair of right and left gripper rod holders 2. A plurality of gripper pads 7 are parallelly split-fixed on the gripper pad shaft 3. A plurality of printing sheet grippers 8 and slip sheet grippers 9 are parallelly split-fixed to the gripper shafts 4 and 5, respectively, to have different phases from those of the gripper pads 7. Cam levers 12 and 13 on which cam followers 10 and 11 are pivotally mounted on their free end portions, respectively, are axially mounted on the shaft end portions of the gripper shafts 4 and 5. Upon traveling of the delivery chains 1, the cam followers 10 and 11 face cams provided near a printing cylinder on the side of a frame at a delivery position, so as to open the grippers at a predetermined timing.

With the above arrangement, when the delivery chains 1 travel and the cam follower 10 is in contact with the cam near the printing cylinder, only the printing sheet grippers 8 are opened and closed to regrip the printing sheet from the grippers of the printing cylinder. Then, the sheet is conveyed to be gripped by the printing sheet grippers 8 and the gripper pads 7. Upon regripping, since the slip sheet grippers 9 are kept closed, a sheet 14 is gripped by the printing sheet grippers 8 to cover the slip sheet grippers 9, as shown in FIG. 8. When the gripped edge of the sheet 14 conveyed in this manner has reached the front of the stack board, a slip sheet is fed onto a feeder board, and the cam follower 11 faces the corresponding cam, so that the slip sheet grippers 9 are opened and closed while causing the printing sheet 14 to leap up, and grip the slip sheet between themselves and the gripper pads 7. Thereafter, when the slip sheet has reached the stack board, the grippers 8 and 9 are simultaneously opened to deliver the printing sheet 14 and the slip sheet to overlap each other.

However, in the conventional slip sheet insertion-delivery apparatus, since each pair of the gripper rods 6 include the two gripper shafts 4 and 5 for the printing sheet and the slip sheet, the overall traveling mechanism including the gripper rod holders 2 is heavy, thus interfering with high-speed and smooth operation. As described above, the printing sheet 14 covers the slip sheet grippers 9, as shown in FIG. 8. When the slip sheet is gripped, the slip sheet grippers 9 must be opened while causing the printing sheet 14 to leap up, and the printing sheet 14 can be easily torn. In order to prevent this, a pitch indicated by p in FIG. 8 between the grippers 8 and 9 must be increased or a gripping margin of the slip sheet gripper indicated by t in FIG. 7 must be decreased. Therefore, paper sheets may be wasted due to misgripping. Thus, the operation is unstable, and adjustment is not easy.

SUMMARY OF THE INVENTION

It is a principal object of the present invention to provide a slip sheet insertion-delivery apparatus for a sheet-fed printing press, which can realize a high-speed, smooth operation and allows easy adjustment.

It is another object of the present invention to provide a slip sheet insertion-delivery apparatus for a sheet-fed printing press, wherein a printing sheet can be prevented from being torn by slip sheet grippers and hence a stable operation can be performed.

In order to achieve the above objects, there is provided a slip sheet insertion-delivery apparatus for a sheet-fed printing press, having a plurality of delivery gripper rods supported between right and left delivery chains at predetermined intervals and each consisting of a gripper shaft and a gripper pad shaft, a plurality of gripper pads arranged along each of the gripper pad shafts, a plurality of printing sheet grippers fixed on each of the gripper shafts at positions corresponding to some of the plurality of gripper pads, a plurality of slip sheet grippers loosely fitted on each of the gripper shafts through torsion springs at positions corresponding to the remaining gripper pads, a cam mechanism for reciprocally pivoting each of the gripper shafts through a predetermined angle at a regripping position from a cylinder so as to simultaneously open/close the printing sheet grippers and the slip sheet grippers and another cam mechanism having a plurality of cams with which cam followers of the slip sheet grippers are in contact, for opening/closing only the slip sheet grippers at a slip sheet insertion position.

BRIEF DESCRIPTION OF THE DRAWINGS

FIGS. 1 to 5 show a slip sheet insertion-delivery apparatus for a sheet-fed printing press according to an embodiment of the present invention, in which FIG. 1 is a side view of a portion near a slip sheet insertion position of an intaglio printing press to which the present invention is applied;

FIG. 2 is a side view of a portion near grippers and gripper pads in an upper travel portion of a delivery chain;

FIG. 3 is a plan view of FIG. 2;

FIG. 4 is a schematic plan view of the overall apparatus;

FIG. 5 is a schematic side view of an intaglio printing press to which the present invention is applied;

FIGS. 6 to 8 show a conventional slip sheet insertion-delivery apparatus in a sheet-fed printing press, in which FIG. 6 is a schematic plan view of the apparatus, FIG. 7 is an enlarged sectional view taken along a line A—A in FIG. 6; and FIG. 8 is a schematic front view when viewed from a direction B in FIG. 7.

DETAILED DESCRIPTION OF THE PREFERRED EMBODIMENT

An embodiment of the present invention will be described with reference to FIGS. 1 to 5.

Figure 5:
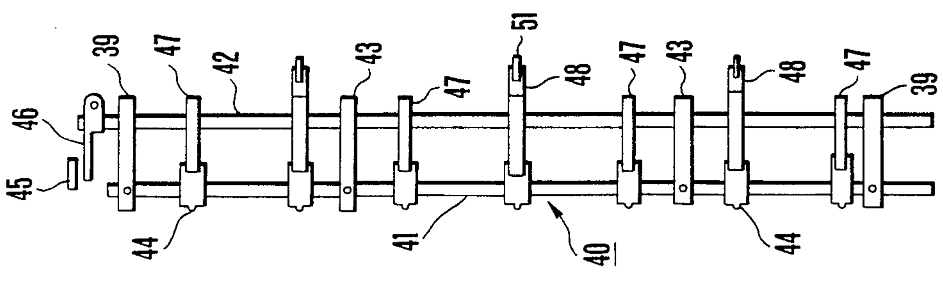
Figure 7:
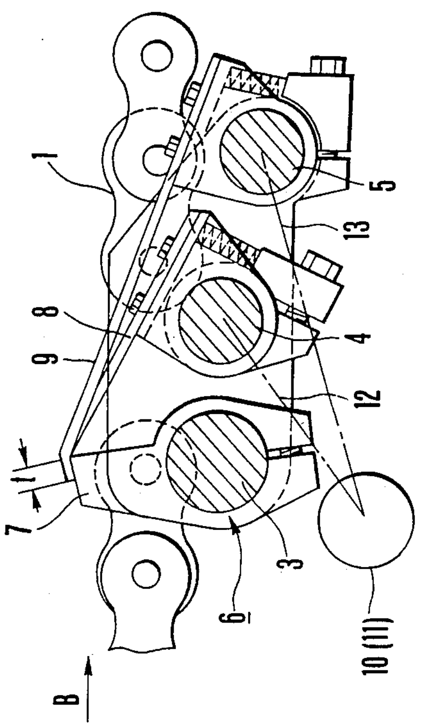
Figure 8:
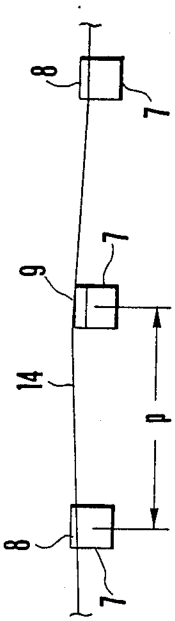
Figure 6:
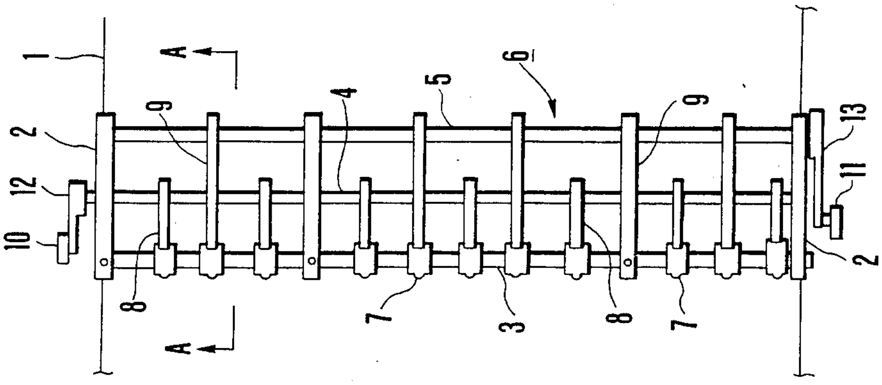

As shown in FIG. 5, in a printing unit 20 of the printing press, a copperplate cylinder 21 having an outer surface on which a copperplate is mounted, and an impression cylinder 23 which has four arrays of a plurality of grippers 22 in gaps of the outer peripheral surface thereof are arranged so that their surfaces oppose each other. A form roller 25 of an inking apparatus 24 and a wiping roller 26 are in contact with the copperplate cylinder 21. A feedboard 28 having a front lay 27 end at its front portion is supported obliquely above the impression roller 2 through swing grippers 29.

With the above arrangement, a printing sheet 30 fed onto the feedboard 28 in a paper sheet feeder is vertically registered by the front lay 27, and is then gripped by the swing grippers 29. Then, the sheet 30 is regripped by the grippers 22 of the impression cylinder 23 and then passes between the impression cylinder 23 and the copperplate cylinder 21. In this case, an image is formed on the plate surface of the copperplate cylinder 21 by cooperation of the inking apparatus 24 and the wiping roller 26. The image is transferred onto the printing sheet 30 passing between the cylinders 23 and 21, thus performing printing.

Figure 1:
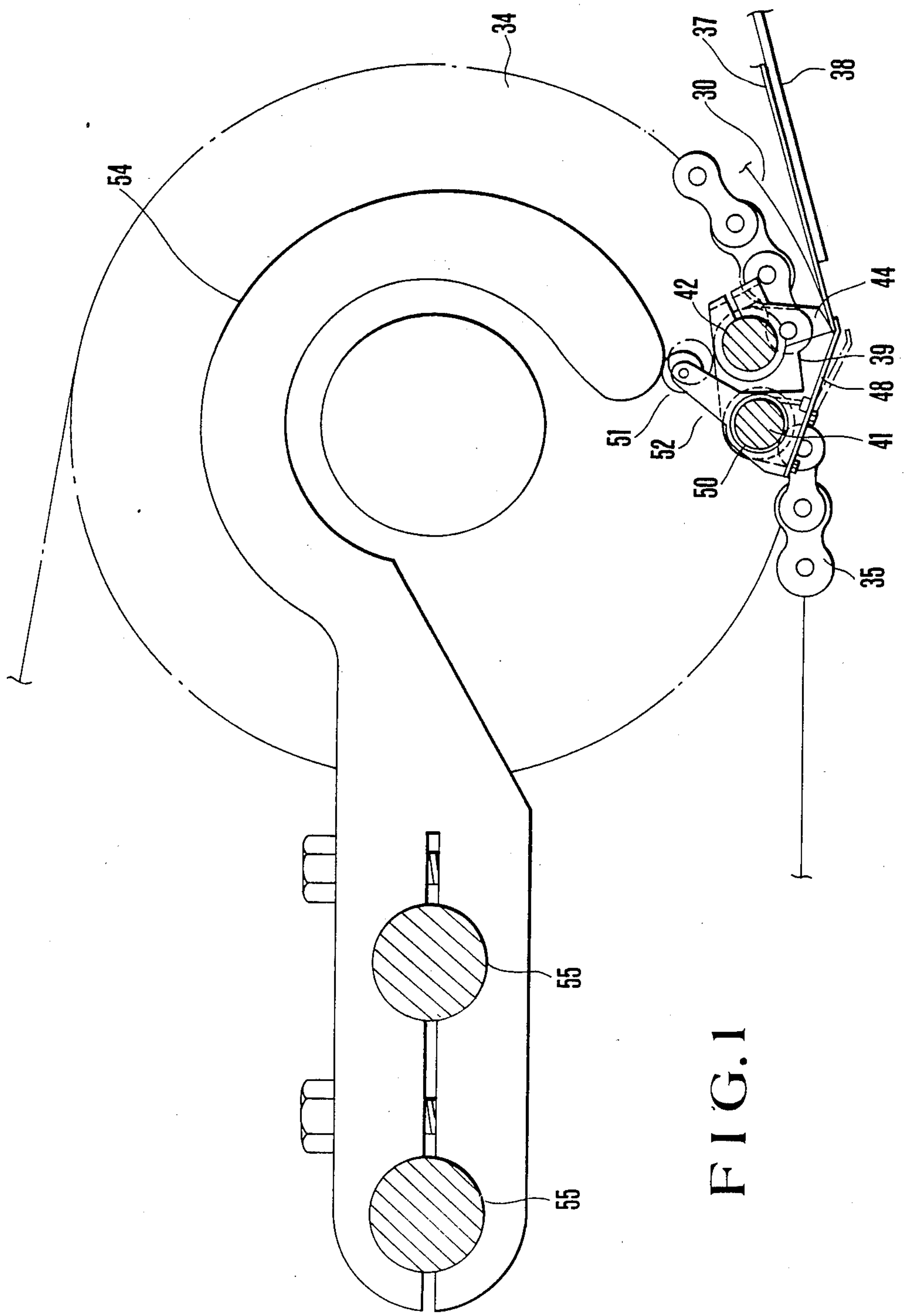
Figure 2:
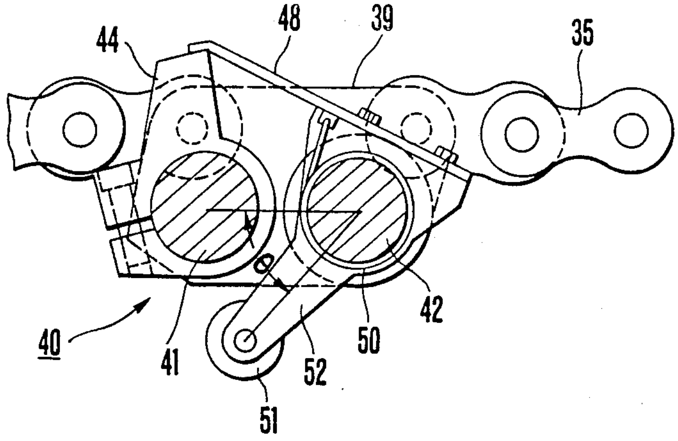
Figure 3:
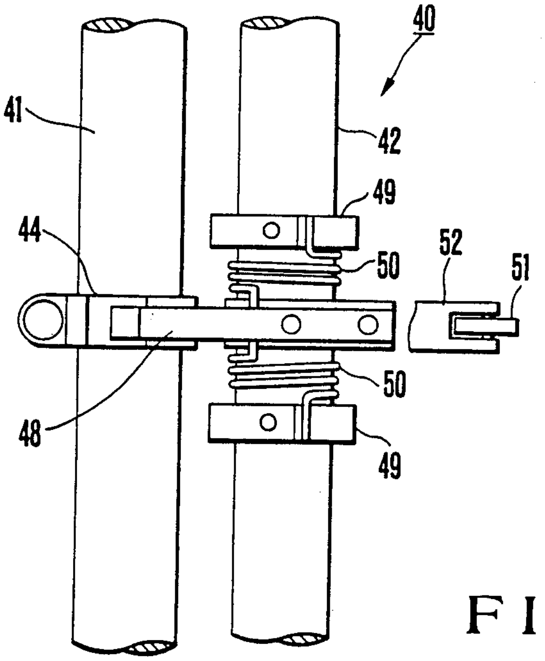
Figure 4:
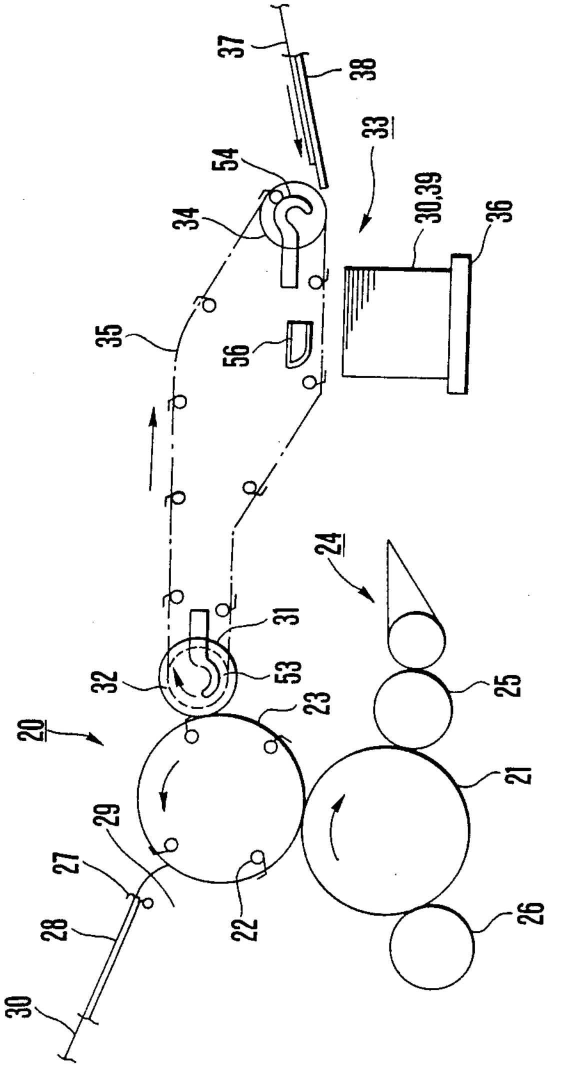

A delivery cylinder 31 is in contact with the surface of the impression cylinder 23, and a pair of right and left delivery chains 35 are looped between a pair of right and left sprockets 32 coaxially provided on the delivery cylinder 31 and sprockets 34 of a delivery apparatus 33. A vertically movable stack board 36 is disposed in the delivery apparatus 33, and a distal end of a feedboard 38 on which a slip sheet 37 fed from the paper sheet feeder is slid and stopped is arranged adjacent to the end of the delivery chains 35. A plurality of substantially rectangular gripper rod holders 39 are fixed to the delivery chains 35 at predetermined intervals. A stationary gripper pad shaft 41 and a pivotal gripper shaft 42 constituting a gripper rod 40 are axially supported between the right and left gripper rod holders 39. Reference numerals 43 denote coupling plates which are located at a plurality of positions of each gripper rod 40 and are fixed to the gripper pad shaft 41. A hole formed on each coupling plate 43 pivotally supports the corresponding gripper shaft 42, thus regulating flexure of the griper shaft 42. A plurality of gripper pads 44 are split-fixed onto the gripper pad shaft 41 at substantially predetermined intervals. A cam lever 46 having a cam follower 45 at its free end portion is axially mounted on the shaft end portion of the gripper shaft 42. A plurality of printing sheet grippers 47 and a plurality of slip sheet grippers 48 having substantially the same structure are alternately arranged on the gripper shaft 42 to face some gripper pads 44 and the remaining gripper pads 44, respectively. The printing sheet grippers of grippers 47 and 48 are fixed to the gripper shaft 42, and are pivoted integrally with the gripper shaft 42. Each slip sheet gripper 48 is pivotally fitted on the gripper shaft 42 and is biased by a pivoting force in a gripper closing direction as a counterclockwise direction in FIG. 2 by torsion coil springs 50 interposed between adjacent collars 49. Each slip sheet gripper 48 is integrally formed with a cam lever 52 on which a cam follower 51 is pivotally supported at its free end portion, and an inclination angle of the cam lever 52 indicated by $\theta$ in FIG. 2 is formed to be substantially the same as that of the cam lever 46. FIGS. 3 and 4 illustrate the cam lever 52 in detail. A single cam 53 having an arcuated cam surface which is almost concentrical with the sprockets 32 and 34, and a plurality of cams 54 are disposed near the sprockets 32 as a regripping portion from the impression cylinder 23 and near the sprockets 34 corresponding to a slip sheet insertion position so that the cam follower 45 and a plurality of cam followers 51 face the corresponding cam surfaces. The cam 53 is fixed to the frame. However, the cams 54 are stationarily supported on a stay 55 coupling the right and left frames. When the delivery chains 35 travel and the cam follower 45 is brought into contact with the cam surface of the cam 53, the gripper shaft 42 is pivoted to simultaneously open all the printing sheet grippers 47 and the slip sheet grippers 48. Thereafter, the grippers 47 and 48 are simultaneously closed. As a result, a printing sheet 30 is gripped by both the printing sheet grippers 47 and the slip sheet grippers 48. When the grippers 47 and 48 gripping the printing sheet 30 have reached the cams 54 and the cam followers 51 face the cam surfaces of the corresponding cams 54, the slip sheet grippers 48 are opened against the biasing force of the torsion coil springs 50, and thereafter, the slip sheet grippers 48 are closed to grip the slip sheet 37 on the feedboard 38. A delivery cam 56 is provided on the frame above the stack board 36 in correspondence with the cam follower 45. When the grippers 47 and 48 gripping the printing sheet 30 and the slip sheet 37 pass by the center of the stack board 36, the cam follower 45 is brought into contact with the cam surface of the delivery cam 56, and the printing sheet grippers 47 and the slip sheet grippers 48 are simultaneously opened and deliver the printing sheet 30 and the slip sheet 37 onto the stack board 36 to overlap each other.

A delivery operation of the printing press with the above arrangement will be described. The printing sheet 30 and the slip sheet 37 are fed onto the feedboards 28 and 38 at predetermined timings to start a printing operation. As described above, the printing sheet subjected to intaglio printing is gripped by the grippers 22, and the gripped edge of the sheet reaches a contact point with the delivery cylinder 31. At this time, since the cam follower 45 is brought into contact with the cam surface of the cam 53, the printing sheet grippers 47 and the slip sheet grippers 48 are simultaneously opened and are then closed, and the grippers 22 are opened. Therefore, the printing sheet 30 is regripped by both the grippers 47 and 48. Upon traveling of the delivery chains 35, when the printing sheet 30 which is conveyed while being gripped by the grippers 47 and 48 has reached a slip sheet insertion position, all the cam followers 51 are in contact with the corresponding cam surfaces of the cams 54 at the same time, and the slip sheet grippers 48 are opened against the biasing force of the torsion coil springs 50. Thereafter, the cam followers 51 pass by the cam surfaces and the grippers 48 are closed. The slip sheet grippers 48 grip the slip sheet 37 on the feedboard 38. As a result, the printing sheet 30 and the slip sheet 37 are gripped by the grippers 47 and 48 while normally overlapping each other. The conveyed sheets 30 and 37 are released from the grippers 47 and 48 when the cam follower 45 is in contact with the cam surface of the delivery cam 56 to simultaneously open the grippers 47 and 48. Then, the sheets 30 and 37 are dropped and stacked on the stack board 36. More specifically, since the printing sheets 30 and the slip sheets 37 are alternately stacked on the stack board 36, no offsetting occurs. The grippers 47 and 48 releasing the sheets 30 and 37 are closed when the cam surface is ended, and are moved toward the printing unit.

In this manner, when the printing sheet 30 is regripped from the grippers 22 of the impression cylinder 23, the printing sheet 30 is gripped by both the grippers 47 and 48, and at the slip sheet insertion position, only the slip sheet grippers 48 are opened to grip the slip sheet 37. Therefore, when the slip sheet grippers 48 are opened, they do not cause the printing sheet 30 to leap up unlike in the conventional apparatus.

As can be understood from the above description, according to the present invention, in a slip sheet insertion-delivery apparatus for a sheet-fed printing press, a plurality of printing sheet grippers facing some of a plurality of gripper pads arranged along a gripper pad shaft and a plurality of slip sheet grippers facing the remaining gripper pads are arranged along a single gripper shaft. The printing sheet grippers are fixed to the gripper shaft, and the slip sheet grippers are loosely fitted on the gripper shaft through torsion coil springs. The printing sheet grippers and the slip sheet grippers are simultaneously opened/closed by a cam mechanism arranged near a printing cylinder, and only the slip sheet grippers are opened/closed by another cam mechanism arranged at a slip sheet insertion position. Thus, a printing sheet released from the grippers of the printing cylinder are regripped and conveyed by both the printing sheet grippers and the slip sheet grippers, and at the slip sheet insertion position, only the slip sheet grippers are opened to grip a slip sheet. The slip sheet grippers can be prevented from tearing the printing sheet when they are opened. Therefore, a pitch between adjacent grippers can be decreased, and a gripping margin of the grippers can be increased. The number of wasted sheets due to misgripping can be decreased, and adjustment of a regripping timing can be facilitated like in a non-slip sheet version printing press. Since the printing sheet is gripped by both the printing sheet grippers and the slip sheet grippers over a long distance, an ideal number and arrangement of grippers like in a non-slip sheet version printing press need not be modified. The two gripper shafts in the conventional apparatus can be reduced to one, and other components can also be omitted accordingly. Therefore, the overall gripper rod can be light in weight. Thus, a high-speed, smooth operation can be achieved, thereby improving productivity. In addition, wear of delivery chains can be reduced, resulting in advantages in maintenance.

What is claimed is:

1. A slip sheet insertion-delivery apparatus for a sheet-fed printing press including and impression cylinder, comprising:

a plurality of delivery gripper rods supported between right and left delivery chains at predetermined intervals and each consisting of a gripper shaft and a gripper pad shaft;

a plurality of gripper pads arranged along each of said gripper pad shafts;

a plurality of printing sheet grippers fixed on each of said gripper shafts at positions corresponding to some of said plurality of gripper pads;

a plurality of slip sheet grippers loosely fitted on each of said gripper shafts through torsion springs at positions corresponding to the remaining griper pads;

a cam mechanism for reciprocally pivoting each of said gripper shafts through a predetermined angle at a regripping position from said impression cylinder so as to simultaneously open/close said printing sheet grippers and said slip sheet grippers, said cam mechanism including cam followers; and another cam machine comprising a plurality of cams with which said cam followers of said slip sheet grippers are in contact, for opening/closing only said slip sheet grippers at a slip sheet insertion position.

* * * * *

UNITED STATES PATENT AND TRADEMARK OFFICE
CERTIFICATE OF CORRECTION

PATENT NO. : 4,846,064

DATED : July 11, 1989

INVENTOR(S) : Toshio Hoshi

It is certified that error appears in the above-identified patent and that said Letters Patent is hereby corrected as shown below:

Column 3, line 27, delete "end", same line, after "front" insert ---- end ----.

Column 3, line 28, delete "2" and insert ---- 23 ----.

Column 4, line 37, after "50" delete the comma ",", same line, after "and" insert ---- , ----.

In the Claims

Column 6, line 20, delete "and" and insert ---- an ----.

Column 6, line 41, delete "machine" and insert ---- mechanism ----.

Signed and Sealed this

Fifth Day of February, 1991

*Attest:*

HARRY F. MANBECK, JR.

*Attesting Officer*

*Commissioner of Patents and Trademarks*